(12) United States Patent
Mele, Jr. et al.

(10) Patent No.: US 7,971,132 B2
(45) Date of Patent: Jun. 28, 2011

(54) UNIVERSAL MULTIMEDIA ENGINE AND METHOD FOR PRODUCING THE SAME

(75) Inventors: Joseph P. Mele, Jr., Sea Girt, NJ (US); Raymond R. Staab, Brick, NJ (US); Robert G. Logan, Lake Como, NJ (US); Anthony L. Fox, Mt. Laurel, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 1012 days.

(21) Appl. No.: 11/620,358

(22) Filed: Jan. 5, 2007

(65) Prior Publication Data

US 2008/0168468 A1    Jul. 10, 2008

(51) Int. Cl.
  *G06F 17/00* (2006.01)
(52) U.S. Cl. .......... 715/203; 715/201; 715/273
(58) Field of Classification Search .......... 715/200, 715/201, 203, 273
  See application file for complete search history.

(56) References Cited

U.S. PATENT DOCUMENTS

| | | | |
|---|---|---|---|
| 6,157,823 A | 12/2000 | Fougnies et al. |
| 6,236,851 B1 | 5/2001 | Fougnies et al. |
| 6,282,633 B1 | 8/2001 | Killian et al. |
| 6,424,706 B1 | 7/2002 | Katz et al. |
| 6,434,378 B1 | 8/2002 | Fougnies |
| 6,477,683 B1 | 11/2002 | Killian et al. |
| 6,477,697 B1 | 11/2002 | Killian et al. |
| 6,631,130 B1 | 10/2003 | Roy et al. |
| 6,636,511 B1 | 10/2003 | Roy et al. |
| 6,636,515 B1 | 10/2003 | Roy et al. |
| 6,640,333 B2 | 10/2003 | Hamlin |
| 6,646,983 B1 | 11/2003 | Roy et al. |
| 6,701,515 B1 | 3/2004 | Wilson et al. |
| 6,732,238 B1 | 5/2004 | Evans et al. |
| 6,754,881 B2 | 6/2004 | Kuhlmann et al. |
| 6,760,888 B2 | 7/2004 | Killian et al. |
| 6,763,327 B1 | 7/2004 | Songer et al. |
| 6,854,046 B1 | 2/2005 | Evans et al. |
| 6,857,108 B2 | 2/2005 | Hamlin |
| 6,862,563 B1 | 3/2005 | Hakewill et al. |
| 6,880,047 B2 | 4/2005 | Spencer |
| 6,888,838 B1 | 5/2005 | Ji et al. |
| 6,912,610 B2 | 6/2005 | Spencer |
| 6,915,414 B2 | 7/2005 | Yearsley et al. |
| 6,931,612 B1 | 8/2005 | Potkonjak et al. |
| 6,941,548 B2 | 9/2005 | Goodwin et al. |
| 6,954,845 B2 | 10/2005 | Arnold et al. |
| 6,985,964 B1 | 1/2006 | Petersen et al. |
| 6,986,127 B1 | 1/2006 | Newlin et al. |
| 6,988,154 B2 | 1/2006 | Latta |
| 7,007,062 B1 | 2/2006 | Serenyi et al. |
| 7,007,156 B2 | 2/2006 | Stark et al. |
| 7,007,163 B2 | 2/2006 | Tardo et al. |
| 7,016,748 B2 | 3/2006 | Hamlin |

(Continued)

*Primary Examiner* — Stephen S Hong
*Assistant Examiner* — Gregory J Vaughn
(74) *Attorney, Agent, or Firm* — Weingarten, Schurgin, Gagnebin & Lebovici LLP

(57) ABSTRACT

A method, system and apparatus for adapting the multimedia content for presentation by an application that uses, processes or otherwise services the multimedia content ("multimedia application") is provided. The method includes receiving the multimedia content formatted in accordance with at least one of a plurality of multimedia protocols; using a function abstracted from the plurality of multimedia protocols to adapt the multimedia content in accordance with one or more capabilities of the multimedia application; and sending the multimedia content so adapted to the multimedia application for presentation.

38 Claims, 5 Drawing Sheets

U.S. PATENT DOCUMENTS

| | | | |
|---|---|---|---|
| 7,020,617 | B2 | 3/2006 | Ouimet |
| 7,020,854 | B2 | 3/2006 | Killian et al. |
| 7,036,106 | B1 | 4/2006 | Wang et al. |
| 7,489,707 | B2 * | 2/2009 | Pung et al. ............... 370/469 |
| 7,602,723 | B2 * | 10/2009 | Mandato et al. ............ 370/236 |
| 7,653,735 | B2 * | 1/2010 | Mandato et al. ............ 709/231 |
| 7,656,815 | B2 * | 2/2010 | Kellerer et al. ............ 370/252 |
| 7,668,191 | B2 * | 2/2010 | Steinback et al. ............ 370/437 |
| 2005/0238050 | A1 * | 10/2005 | Pung et al. ............... 370/469 |
| 2006/0268933 | A1 * | 11/2006 | Kellerer et al. ............ 370/469 |
| 2006/0294112 | A1 * | 12/2006 | Mandato et al. ............ 707/100 |
| 2007/0058716 | A1 | 3/2007 | Blum |

* cited by examiner

UNIVERSAL MULTIMEDIA ENGINE AND METHOD FOR PRODUCING THE SAME

BACKGROUND OF THE INVENTION

1. Field of the Invention

Embodiments of the present invention generally relate to multimedia communications, and more particularly, to a method, system and apparatus for adapting multimedia content for presentation by a multimedia application.

2. Related Art

Recent attempts to obtain licenses to obtain technology for delivering multimedia content (e.g., speech, music, video and rich text) to a user of a handheld device have uncovered a dysfunctional marketplace for such multimedia-delivering technology. That is, the attempts have revealed a stagnant marketplace that (i) has a limited cartel of suppliers; (ii) demands un-warranted licensing fees given actual worth of underlying technologies; (iii) is mired in uncertainty given intellectual property coverage; and (iv) offers, limited-life, un-scaleable technologies.

As a consequence of this dysfunctional marketplace, emergence of new multimedia applications, such as real-time multimedia applications, is hindered. The emergence is hindered because requirements for such emerging real-time multimedia applications far exceed today's offerings and capabilities thereof. Considering recent trends of handheld devices, for example, existing multimedia applications lack the capabilities for fulfilling power, footprint, performance, cost and complexity requirements to reliably, inexpensively and optimally deliver real-time multimedia content to such handheld devices.

In addition, as new multimedia applications are introduced into the marketplace (albeit slowly), legacy handheld devices are obsolesced due to their inability to scale up to the new multimedia applications. This, in turn, requires users of such legacy handheld devices to retire their legacy handheld devices and obtain (e.g., by purchase and/or lease) new handheld devices. Unfortunately, this process repeats far too often; costing the users (i.e., consumers) seemingly unnecessary spending of capital.

Therefore, what is needed in the art is a method, system and apparatus for accelerating introduction of new multimedia applications, which can be deployed, for example, in next-generation handheld devices. There is a further need for the method, system and apparatus to accelerate the introduction of new multimedia applications without necessarily causing obsolescence of the next-generation handheld devices, and yet, be capable of fulfilling power, footprint, performance, cost and complexity requirements to reliably, inexpensively and optimally adapt the multimedia content for presentation by the multimedia application in real-time, near real-time, or other time-sensitive or a time-insensitive period.

SUMMARY

A method, system and apparatus for accelerating introduction of new multimedia applications, which can be deployed in, for example, a next-generation handheld device is provided. Embodiments of the method, system and apparatus may employ functions abstracted or otherwise formed in accordance with rules, procedures, conventions, etc. that define protocols for processing multimedia content ("multimedia protocols"), such as those used to define multimedia CODECs for video, audio, speech, and rich text; commercial, freeware, open source or otherwise.

Included in the method, system and apparatus for accelerating introduction of new multimedia applications is a method for adapting the multimedia content for presentation by an application that uses, processes or otherwise services the multimedia content ("multimedia application"). This method includes receiving the multimedia content formatted in accordance with at least one of a plurality of multimedia protocols; using a function formed in accordance with or otherwise abstracted from the plurality of multimedia protocols to adapt, modify, append, enhance, improve, etc., (collectively, "adapt") the multimedia content in accordance with one or more capabilities of the multimedia application; and sending the multimedia content so adapted to the multimedia application.

Advantageously, examples of the apparatus, system and method allow merging of multiple multimedia-delivering technologies into a tightly integrated, highly optimized, and easy-to-use multimedia-processing module that is capable of fulfilling power, footprint, performance, cost and complexity requirements to reliably, inexpensively and optimally adapt the multimedia content for presentation by the multimedia application in real-time, near real-time, or other time-sensitive or a time-insensitive period. This multimedia-processing module may be used in or with the next generation of handheld devices, such as products that will combine functionality of smart phones, Apple iPods, Sony Playstation Portables (PSPs™), video players/recorders, and more.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of or in combination with of the embodiments disclosed.

As summarized above and described in more detail below, the method, system and apparatus for accelerating introduction of new multimedia applications, which can be deployed in, for example, a next-generation handheld device, is provided. Embodiments of the method, system and apparatus may employ functions abstracted or otherwise formed in accordance with rules, procedures, conventions, etc. that define the multimedia protocols, such as those used to define multimedia CODECs for video, audio, speech, and rich text; open source or otherwise. By integrating, amalgamating, assimilating and optimizing the rules, procedures, conventions, etc. that define the multimedia protocols, the functions so abstracted (hereinafter "abstracted functions") may be assembled into the aforementioned multimedia-processing module.

Example Architecture

Figure 1:
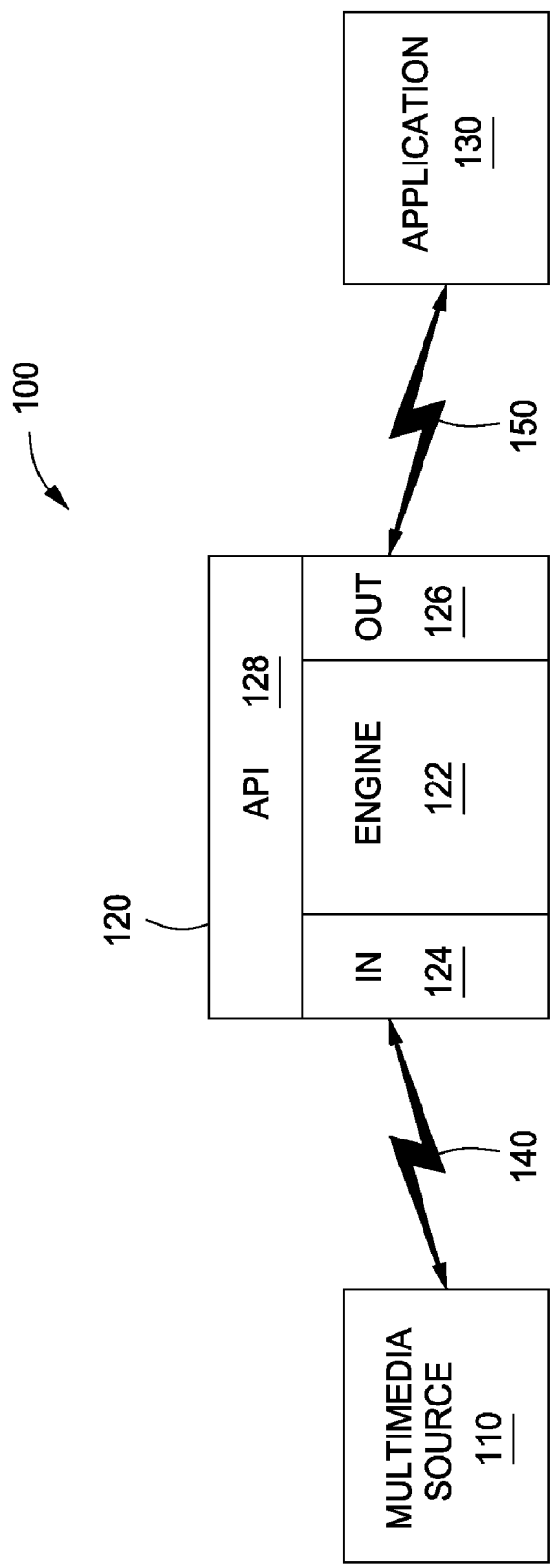
FIG. 1 is a first block diagram depicting an example of a system for adapting multimedia content for presentation by a multimedia application.

FIG. 1 is a block diagram depicting an example of a system 100 for adapting multimedia content for presentation by a multimedia application. The system 100 includes a multimedia source 110, a multimedia-processing module 120, and a multimedia application 130.

The system 100 may be disposed in a single device, which may be configured for handheld or other use. Alternatively, the system 100 may be distributed among a plurality of devices. For example, the multimedia-processing module 120 and multimedia application 130 may be disposed on a first device, which may be configured for handheld use, and the multimedia source 110 may be disposed on a second device, which may be remotely-located from first device. Alternatively, the multimedia source 110, multimedia-processing module 120 and the multimedia application 130 may be disposed on different devices.

The multimedia-processing module 120 is operable to process multimedia content received from multimedia source 110 into adapted-multimedia content, and communicate the adapted-multimedia content to multimedia application 130 for subsequent presentation. To facilitate this, the multimedia-processing module 120 may be communicatively coupled to the multimedia source 110 via a first communication path 140; over which the multimedia-processing module 120 may receive the multimedia content. The multimedia-processing module 120 may be also communicatively coupled to the multimedia application 130 via a second communication path 150; over which the multimedia-processing module 120 may send the adapted-multimedia content.

Each of the first and second communication paths 140, 150 may be formed from one or more linkable segments. These segments may be disposed in one or more wired and/or wireless communication networks and/or one or more electrical busses of the multimedia source 110, the multimedia-processing module 120 and multimedia application 130.

The multimedia source 110 is operable to source or otherwise provide the multimedia content to the multimedia-processing module 120. Prior to sourcing the multimedia content, the multimedia source may capture and/or collect the multimedia content.

To facilitate capturing the multimedia content, the multimedia source 110 may include, natively, one or more devices for capturing the multimedia content ("capture devices"). Examples of the capture devices include analog and or digital microphones, video cameras, still-photo cameras, embedded or peripheral webcams, and the like. Alternatively, the multimedia source 110 may gather some or all of the multimedia content from a plurality of foreign (e.g., remotely-located) and/or native capture devices.

To facilitate processing the multimedia content, the multimedia-processing module 120 includes an engine 122 having an input 124 and an output 126; and an application programming interface ("API") 128. The engine 122 or any other portion of the multimedia-processing module 120 may be formed from one or more programmable and/or hard-coded, executable instructions, commands, directions, code and/or control data (collectively, "directives") for processing the multimedia content received via the input 124 into the adapted-multimedia content, and for communicating the adapted-multimedia content to the output 126.

The directives and/or any other portion of the engine 122 may be implemented in software, firmware and/or hardware, and executed or otherwise addressed and instructed by a processing platform (not shown) to carry out such processing. To facilitate this, the processing platform may include, for example, any of a general purpose computer, a special-purpose computer, a field programmable gate array ("FPGA"), an application specific integrated circuit ("ASIC"), a general purpose processor ("GPP"), a system on a chip ("SoC"), and the like.

The input 124 is operable to receive the multimedia content from the multimedia source 110. To facilitate reception, the input 124 may be configured to receive the multimedia content in streamed, non-streamed, and/or other form. In addition, the input 124 is also operable to communicate the multimedia content to the engine 122 via a communicative coupling or interface (not shown).

The engine 122, in turn, is operable to obtain the multimedia content from the input 124, and to apply to the multimedia content one or more of the abstracted functions. These abstracted functions are operable to adapt, modify, append, enhance, improve, adjust, add, etc., (collectively, "adapt") the multimedia content in accordance with one or more capabilities of the multimedia application 130 ("multimedia application's capabilities") to form the adapted-multimedia content.

For example, the multimedia application's capabilities may include provisions for tone control and video quality enhancement and/or control, such as color enhancement and/or tinting. The multimedia content may or might not be formatted for such capabilities. Despite this, the engine 122 may process the multimedia content so as to form the adapted-media content in accordance with the multimedia application's capabilities. The engine 122 may form such adapted media content by applying, where appropriate, one or more of the abstracted functions for adapting (i) audio components of the multimedia content with the tone control and/or other audio enhancements, and/or (ii) video components of the multimedia content with the video quality enhancement and/or controls.

The abstracted functions applied by the engine 122 (as configured by the API 128, as noted below) may be optimized for the multimedia application's capabilities. For example, the engine 122 may apply one or more of the abstracted functions to adapt the multimedia content to default to a maximum or other quality level that is consistent with the multimedia application's capabilities. The engine 122 may achieve such quality level by applying the abstracted functions that balance or otherwise regulate the quality level against an amount of functions to be applied.

For example, the engine 122 may apply the abstracted functions for adapting the multimedia content to a highest quality level possible while using a least common denominator approach. This may be facilitated by the engine 122 using a minimum number of the abstracted functions to adapt the multimedia content to a maximum quality level consistent with the multimedia application's capabilities. The engine 122 may use other approaches for adapting quality and/or performance of the multimedia content.

Because the abstracted functions are abstracted in accordance with the plurality of multimedia protocols, the engine 122 is operable to provide interoperability and seamless capabilities negotiations between the multimedia application 130 and the multimedia source 110. The engine 122 is operable to do this by carrying out handshaking with the multimedia source 110 in accordance with the multimedia protocol associated with the multimedia content, and carrying out handshaking with the multimedia application 130 in accordance with the multimedia application's capabilities.

In addition to being operable to adapt the multimedia content, the engine 122 is further operable to communicate the adapted-multimedia content to the output 126. In turn, the output 126 is operable to communicate the adapted-multimedia content to the multimedia application 130, where appropriate.

The multimedia application 130 may be most any application that uses, processes or otherwise services (collectively, "services") the adapted-multimedia content for communication to a user of the device 100. To facilitate the servicing of the adapted-multimedia content, the multimedia application 130 may include directives for presenting the adapted-multimedia content. These directives may be formed so as to cause the multimedia application 130 to playback audio and/or video, and/or display graphical and/or textual components of adapted-multimedia content. Examples of the multimedia application 130 include commercial, freeware, proprietary, open source and like-type multimedia players and/or multimedia generators.

Although the multimedia application 130 is shown as a single, unitary element and described as operable to playback different components of the adapted multimedia content, the directives of multimedia applications 130 may be formed into a plurality of multimedia applications. This plurality of multimedia applications, when combined, may have capabilities equivalent or similar to the capabilities of the multimedia application 130. Alternatively, some of the directives of the multimedia application 130 may be omitted when forming the plurality of multimedia applications. This way, the capabilities of such plurality of multimedia applications, when combined, may be different from the capabilities of the multimedia application 130.

The API 128 is operable to acquire, harvest, gather, garner or otherwise obtain the multimedia application's capabilities. These capabilities may be obtained via (i) communicative couplings to exposed hooks of the multimedia application 130, (ii) other communication with the multimedia application 130; and/or (iii) documentation associated with the multimedia application 130. With respect to obtaining the capabilities via (i) or (ii), the API 128 may interface with and extract from multimedia application 130 the multimedia application's capabilities.

With such knowledge, the API 128 is operable to interface with the engine 122 to configure the engine 122 for processing the multimedia content. To facilitate this, the API 128 includes one or more directives for causing the engine 122 to select the abstracted functions to allow for communication of the adapted-multimedia content in accordance with the multimedia application's capabilities.

For example, the API 128 may be operable to configure the engine 122 to select the abstracted functions for adapting the audio components of the multimedia content with tone control or other audio enhancement. These functions may adapt the audio components of the multimedia content for user adjustable tone control, depending, of course, on the capabilities of the multimedia application 130. Alternatively, the functions may be implemented to allow static or dynamic adjustment of the tone without interaction from the user.

In addition, the API 128 may shield complexity of the engine 122 by employing algorithms that adjust resources of the engine 122 and processing platform to maximize efficiency of power usage and performance, flexibility, and resource sharing. For example, the API 128 can cause the engine 122 to select the abstracted functions to form and communicate to the multimedia application 130 the adapted-multimedia content in, for example, the highest quality possible using the least common denominator approach. The API 128 may configure the engine 122 to select other functions as well.

The foregoing describes the multimedia-processing module 120 as having only one input and one output, namely the input 124 and the output 126. However, the multimedia-processing module 120 may include more than one input and/or output. Alternatively, each of the input 124 and the output 126 may embody a combined input and output (referred to herein as "I/O"). For convenience, the input 124 and output 126 are referred to hereinafter as first I/O 124 and second I/O 126, respectively.

Notwithstanding any such configuration, the multimedia-processing module 120 may be configured to permit bidirectional or multidirectional flow. As such, the multimedia-processing module 120 may be operable to communicate adapted-multimedia content to the multimedia application 130 and/or a multimedia application associated with a device that is foreign to (i.e., not native and/or separate from) the system 100. This way, any adapted-multimedia content sourced from the multimedia application 130 or any multimedia content sourced from the multimedia source 110 can be communicated to the foreign multimedia application in a form consistent with one or more of the capabilities of the foreign multimedia application.

As described in more detail below with reference to FIG. 2 below, the multimedia-processing module 120 may apply the abstracted functions for un-adapting previously adapted-multimedia content or for adapting the multimedia content in accordance with the capabilities of the foreign multimedia application. Beneficially, this processing of the previously adapted-multimedia or un-adapted multimedia content provides interoperability and seamless capabilities negotiations between the foreign multimedia application and the multimedia application 130 and/or the multimedia source 110.

In addition, the system 100 may include additional multimedia-processing modules (not shown). This allows addition of new algorithms or removal of other functionality based on the desired behavior. By allowing such scaling, the additional multimedia-processing modules may allow for full customization without the cost of writing and re-writing custom directives.

Each of the multimedia-processing module 120 and the additional multimedia-processing modules (collectively the "multimedia-processing modules") may be designed such that it is not locked into any specific system, protocol, platform, or data store. In addition, each of the multimedia-processing modules may be cross-platform, thereby providing the same services on differing processing platforms. Alternatively and/or additionally, each of the multimedia-processing modules may also be ported to new platforms, abstracting operating system and hardware dependencies, and may be extendable, thereby relieving an application developer of writing code for a specific protocol, platform and/or database.

Each of the multimedia-processing modules may include one or more functional modules, which allow the addition of new algorithms or removal of other functionality based on the desired behavior. Like the scaling provided by the ability to add or subtract the number of multimedia-processing modules to the system 100, the functional modules may allow for full customization without the cost of writing and re-writing custom code.

Example Operation

Figure 2:
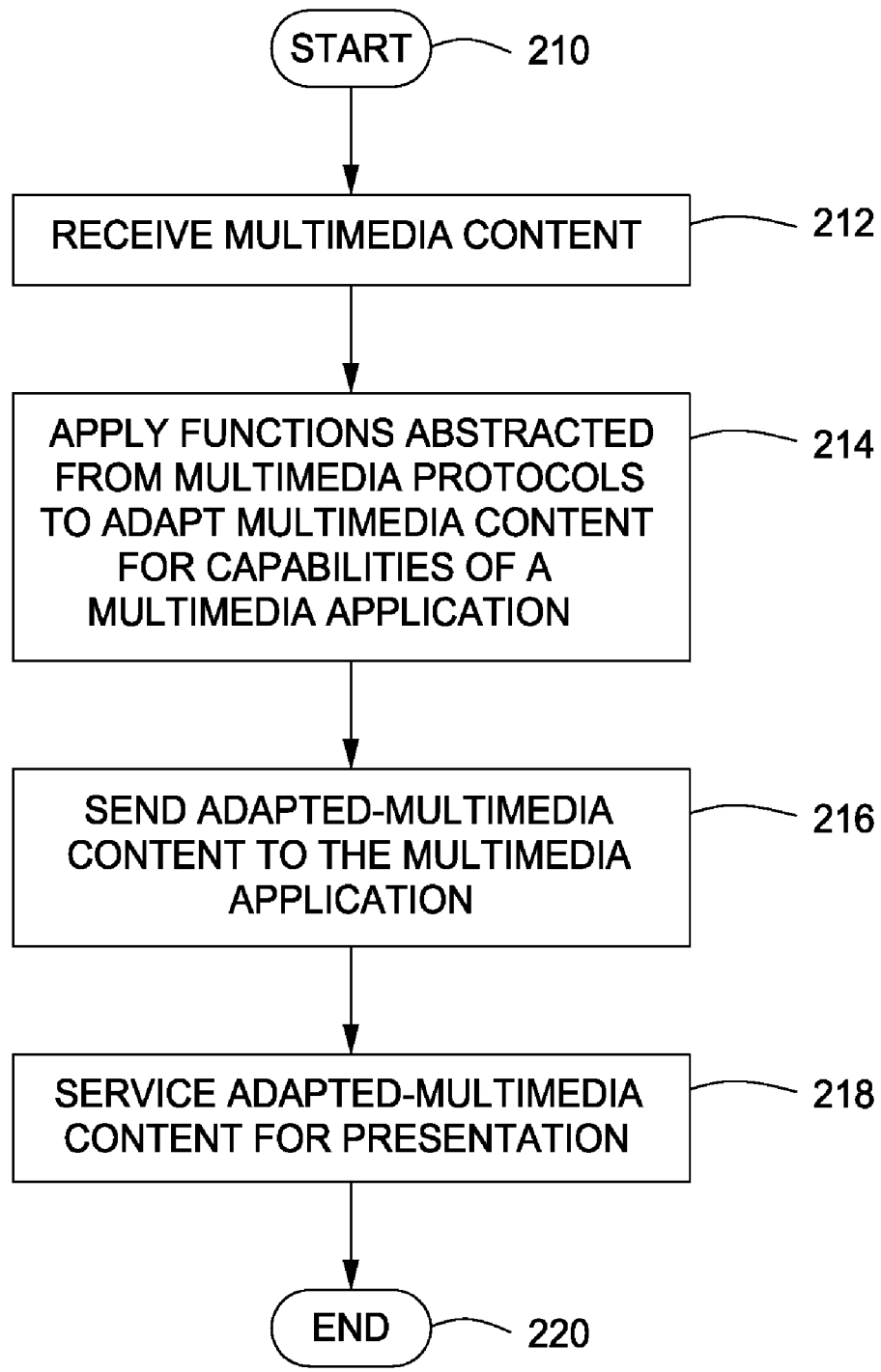
FIG. 2 is a first flow diagram depicting an example of a process for adapting multimedia content for presentation by a multimedia application.

FIG. 2 is a flow diagram depicting an example of a process 200 for adapting multimedia content for presentation by a multimedia application. For convenience, the process 200 is described herein with respect to the architecture shown in FIG. 1.

The process 200 begins at termination block 210, and then transitions to process block 212 responsive to the multimedia source 110 sending the multimedia content to the multimedia-processing module 120. At process block 212, the first I/O 124 receives the multimedia content from the multimedia source 110, and then passes it to the engine 122.

After obtaining the multimedia content from the first I/O 124, the engine 122 forms the adapted-multimedia content for termination to the multimedia application 130. To do this, the engine 122 may apply to the multimedia content one or more of the abstracted functions to adapt the multimedia content in accordance with the multimedia application's capabilities, as shown in process block 214. After forming the adapted-multimedia content, the engine 122 communicates the adapted-multimedia content to the second I/O 126.

At process block 216, the second I/O 126 communicates the adapted-multimedia content to the multimedia application 130. In turn, the multimedia application 130 services the adapted-multimedia content for presentation, as shown in process block 218.

After process block 218, the process 200 transitions to termination block 220, at which point the process 200 ends. Alternatively, the process 200 may be repeated periodically, in continuous fashion, or upon being triggered as a result of a condition, such as reception of additional multimedia content or for further processing of the adapted-multimedia content.

In addition to a plethora of various possible embodiments of the process 200, the following describes two examples of the process 200. Each of the two examples employs the process 200 to carry out multiple communication sessions. Each of the multimedia sessions includes one or more communications in which the multimedia content sourced from one or more multimedia sources is adapted for presentation by one or more multimedia applications.

As with any embodiment of the process 200, each of the communications of the multiple multimedia sessions may be terminated to the multimedia applications in real-time, near real-time, other time-sensitive period, and/or a time-insensitive period with respect to origination of the multimedia content or reception of the multimedia content at the first or second I/O 124, 126. Alternatively, each of the communications of the multiple multimedia sessions may be terminated to the multiple multimedia applications at a rate for preventing or otherwise minimizing degradation in quality and/or performance of a stream or other flow of the multimedia content (collectively "stream").

In addition, quality and/or performance of the stream may be monitored and/or compared given acceptance limits. If either of the quality or performance of the stream fails to satisfy the respective acceptance limits, then the process 200 may be adjusted so as to cause the quality and/or performance of the stream to fall within the given acceptance limits.

As another alternative, some or all portions of the stream may be buffered so that the termination of a given portion of the stream is coterminous or substantially continuous with reception of a subsequent portion of the stream at the first or second I/O 124, 126. Alternatively, some or all portions of the stream may be buffered so that reception of the subsequent portion of the stream at the first or second I/O 124, 126 is at a non-zero, but acceptable latency from the termination of the given portion of the stream.

EXAMPLE 1

In this example, the multimedia sources may be include first, second, third and fourth multimedia sources. The first multimedia source is operable to source music content, the second multimedia source is operable to source mixed multimedia content, the third multimedia source is operable to source telephonic audio content, and the fourth multimedia source is operable to source video and/or still-photograph content.

The multimedia applications may include an audio playback application native to the system ("native audio application"), an audio playback application foreign to the system ("foreign audio application"), a video playback application native to the system 100 ("native video application"), and a video playback application foreign to the system 100 ("foreign video application"). Additionally, this example employs the process 200 to communicate six multimedia sessions.

The first multimedia session begins at termination block 210, and then transitions to process block 212 responsive to the first multimedia source sending music content to the multimedia-processing module 120 at request of the multimedia-processing module 120. At process block 212, the first I/O 124 receives the music content from the first multimedia source 110 and passes it to the engine 122.

The engine 122, in turn, forms adapted-music content from the music content and the abstracted functions for adapting the music content in accordance with the capabilities of the native-audio application. As shown in process block 214, the engine 122 may form the adapted-music content by applying the abstracted functions to the music content. This may include, for example, applying to the music content the abstracted functions for adapting the music content with tone control. Application of these abstracted functions may adapt the music content so as to increase, decrease and/or level one or more treble, bass or other components of the music content. After forming the adapted-music content, the engine 122 communicates the adapted-music content to the second I/O 126.

At process block 216, the second I/O 126 communicates the adapted-music content to the native audio application. In turn, the native audio application services the adapted-music content for presentation (e.g., playback of the adapted-music content) to a user of the system 100, as shown in process block 218.

At some point during the first session, the second session begins, as shown in termination block 210. At process block 212, the first I/O 124 receives from the second multimedia source the mixed content that is in the form of an announcement of a phone call ("announcement content"), such as a calling-number identification message, commonly referred to as caller-identification. After receiving the announcement content, the first I/O 124 passes it to the engine 122.

The engine 122, in turn, forms adapted-announcement content from the announcement content and the abstracted functions for adapting the announcement content in accordance with the capabilities of the native-video application. The engine 122 may form the adapted-announcement content by applying such abstracted functions to the announcement content, as shown in process block 214. For example, the engine 122 may apply the abstracted functions for adapting the announcement content with textual and/or video enhancement, such as scrolling of or adding visual effects to the announcement content.

After forming the adapted-announcement content, the engine 122 communicates the adapted-announcement content to the second I/O 126. At process block 216, the second I/O 126 communicates the adapted-announcement content to the native-video application. In turn, the native-video application services the adapted-announcement content for presentation (e.g., display) to the user of the system 100, as shown in process block 218.

At some point during either or both of the second and/or first sessions, the third session begins, as shown in termination block 210. At process block 212, the first I/O 124 may receive from the second multimedia source additional mixed content associated with the phone call ("call-associated content"). This call-associated content, for example, may include (i) a ringing signal associated with the phone call; (ii) one or more ring tones assigned to or otherwise associated with the ringing signal and/or originator of the phone call; (iii) a text-to-speech synthesized conversion of the phone-call announcement; and/or (iv) voice content of the phone call for termination to the first multimedia application 130 ("terminating-voice content"). The call-associated content, of course, does not include the terminating-voice content if the phone call is not answered.

After receiving the call-associated content, the first I/O 124 passes it to the engine 122. The engine 122, in turn, forms adapted-mixed content from the call-associated content and the abstracted functions for adapting the call-associated, un-adapted music and/or adapted-music contents in accordance with the capabilities of the native-audio application and/or the native-video application, as appropriate.

The engine 122 may form the adapted-mixed content by applying to the call-associated, un-adapted music and/or adapted-music content such abstracted functions, as shown in process block 214. For example, the engine 122 may apply the abstracted functions for adapting the call-associated, un-adapted music and/or adapted-music content to emphasize the call-associated content. To facilitate the emphasis of the call-associated content, the engine 122 may apply the abstracted functions for attenuating the un-adapted music and/or adapted-music content. Alternatively and/or additionally, the engine 122 may apply the abstracted functions for (i) amplifying the call-associated content or (ii) otherwise differentiating the call-associated content from the un-adapted music and/or adapted-music content.

As another option, the engine 122 may apply the abstracted functions for adapting (i) the un-adapted music content to fade out, and (ii) the terminating-voice content to fade in. Alternatively, the engine 122 may apply abstracted functions for adapting the terminating-voice content for immediately presentation.

By forming the adapted-mixed content in accordance with the foregoing, the servicing of audio components of the adapted-mixed content by the native-audio application allows a conversation to ensue without the adapted-music content being commingled with, masking and/or otherwise drowning out adapted the terminating-voice content.

After forming the adapted-mixed content, the engine 122 communicates it to the second I/O 126. At process block 216, the second I/O 126 communicates the adapted-mixed content to the native-audio application and/or native-video application, as appropriate. In turn, the native-audio application and/or native-video application service the adapted-mixed content to allow presentation (e.g., playback) to the user of the system 100, as shown in process block 218.

The fourth multimedia session starts at termination block 210 after a device foreign to the system 100 ("foreign device") issues an off-hook condition and/or answers the phone call, and communicates such condition back to the system 100. After this, the system 100 invokes a capture device, such as a microphone or other speech-pickup device, to receive from the user of the system 100, and in turn, provide to the third multimedia source voice content that is originated to the foreign-audio application (hereinafter, "originating-voice content").

At process block 212, the first I/O 124 may receive the originating-voice content from the third multimedia source 110. The engine 122, which is handling the adapted-mixed content, and more particularly, the terminating-voice content, can discern therefrom one or more of the capabilities of the foreign-audio application.

At a minimum, the engine 122 can discern from the terminating-voice content the multimedia protocols used to code such content. Accordingly, the engine 122 may form adapted-originating-voice content in accordance with the capabilities of the foreign-audio application.

To form the adapted-originating-voice content, the engine 122 may apply the abstracted functions for adapting the originating-voice content in accordance with the capabilities of the foreign-audio application, as shown in process block 214. If, for example, the capabilities of the foreign-audio application do not include provisions for applying tone control, but the capture device and/or the third multimedia source apply tone control to the voice-content it receives, then the engine 122 may apply the abstracted functions to the originating-voice content to remove from the originating-voice content any tone control applied thereto by the capture device and/or the third multimedia source.

After forming adapted-originating-voice content, the engine 122 communicates it to the second I/O 126. At process block 216, the second I/O 126 communicates the adapted-originating-voice content to the foreign-audio application. In turn, the foreign-audio application services the adapted-originating-voice content for presentation (e.g., playback), as shown in process block 218. Deployment of the second and third sessions allow the system 100 to carry a bidirectional conversation between the native and foreign audio applications, thereby providing the interoperability and seamless capabilities negotiations between the native and foreign audio applications.

At some point during the phone call, the user of the system 100 decides to invoke a video capture device, such as camera, to capture streaming video and/or still picture content and communicate such content to the fourth multimedia source. The fourth multimedia source may, in turn, source the streaming video and/or still picture content to the multimedia processing engine 122 with or without a request.

The fifth multimedia session may begin responsive to the fourth multimedia source sending to the multimedia-processing module 120 the streaming-video and/or still picture content for origination to the foreign-video application by way of a video conference session with the foreign device, as shown in termination block 210. The video conference session may be deployed in combination with or, alternatively, in lieu of the third and fourth communications sessions. In the latter case, the third and fourth communications may terminate, as shown in termination block 220.

At process block 212, the first I/O 124 receives from the fourth multimedia source 130 the streaming-video and/or still picture content. Prior to adapting the streaming-video and/or still picture content (collectively "originating-video-conference content"); however the API 128 queries the foreign-video application to discover its capabilities. The API 128 then configures the engine 122 to select the abstracted functions for adapting the originating-video-conference content to make communication of adapted-originating-video content to the foreign multimedia application possible.

At process block 214, the engine 122 forms the adapted-originating-video content from the originating-video-conference content and the abstracted functions for adapting the originating-video-conference content to make the aforementioned communication possible. To form the adapted-originating-video content, the engine 122 may apply such abstracted functions. For example, the engine 122 may apply the abstracted functions for adapting the originating-video-conference content with video quality enhancement and/or control, such as color enhancement and/or tint and/or perceptual coding techniques.

After forming the adapted-originating-video content, the engine 122 communicates it to the second I/O 126. At process block 216, the second I/O 126 communicates the adapted-originating video content to the foreign-video application. In turn, the foreign-video application services the adapted-originating-video content for presentation (e.g., playback) to a user of the foreign device, as shown in process block 218.

In addition to the originating-video-conference content, the video conference session may also include a communication of video content from a multimedia source associated with the foreign device for termination to the native-video application. The terminating-video content may be communicated to the first I/O 124 via the third multimedia source.

After reception of the terminating-video content, the engine 122 forms adapted-terminating-video content from the terminating-video content and the abstracted functions for adapting the terminating-video-conference content to the capabilities of the native-video application. To form the adapted-terminating-video content, the engine 122 may apply these functions to the terminating-video-conference, as shown in process block 214. The engine 122 may do this by applying the abstracted functions for adapting the terminating-video-conference content with video quality enhancement and/or control, such as color enhancement and/or tint and/or perceptual coding techniques.

After forming the adapted-terminating-video content, the engine 122 communicates it to the second I/O 126. At process block 216, the second I/O 126 communicates the adapted-originating video content to the native-video application. In turn, the native-video application 130 services the adapted-terminating-video content to allow presentation (e.g., playback) to the user of the system 100, as shown in process block 218.

As an alternative or in addition to communicating the terminating-video-conference content, the user of the device 100 may invoke the native-video application to stream to the foreign multimedia application recorded video and still picture content (collectively "recorded-video content"). After invoking the native-video application to stream the recorded-video content, the sixth session begins, as shown in termination block 210. To limit repetition of discussion, the process 200 is employed to form adapted-recorded-video content in accordance with the principles disclosed hereinabove.

After forming the adapted-recorded-video content, the user of the device 100 may receive, via the native-video application, a playback of the adapted-terminating-video conference content, while the user of the foreign device may receive, via the foreign-video application, adapted-recorded-video content and/or the adapted-originating-video content.

Depending on the capabilities of the foreign-video application, the engine 122 may apply the abstracted functions for adapting, in accordance with display capabilities of the foreign-video application, the recorded-video content and the originating-video content. For example, the abstracted functions for adapting the recorded-video content and the originating-video content may cause the foreign multimedia application to display both of the adapted-recorded-video content and the adapted-originating-video content in split, tiled, alternating or other formatted displays.

After termination of the video conference and the phone call, the second, third, fourth, fifth and sixth multimedia session may terminate, as shown in termination block 220. Similarly, the first session may terminate, as shown in termination block 220. Alternatively, the process 200 may return to process block 214 while the first multimedia session is active.

At process block 214, the engine 122 may apply the abstracted functions for adapting the un-adapted music and/or adapted-music (but not presented) content so as to fade in the adapted-music content after completion (e.g., tear down) of the phone call and the video conference session. These abstracted functions may cause the native audio application to fade in the adapted-music content at the same position or a position before or after the position from where the native-audio application caused the earlier fade out of the adapted-music content.

Upon termination of the first session, the process 200 may be terminated, as shown in block 220. Alternatively, additional sessions may be started, in which case the process 200 may be repeated for each of the additional sessions.

EXAMPLE 2

In this example, the multiple multimedia applications may include a video game application native to the system 100, the native-audio application, a native-mixed-media application, foreign-audio applications, and a location-based application.

The video game application may be configured for multi-player, networked gaming participation by a user of the system 100 ("native user") and one or more users foreign to the system 100 ("foreign users"). The native-audio application may be configured to present adapted-terminating-voice content to the native user. The native-mixed-media application may be configured to present adapted-mixed content to the native user. The foreign-audio applications may be configured to present adapted-originating-voice content to the foreign users. The location-based-multimedia application may be configured to locating the system 100.

The multiple multimedia sources may include a gaming-content source, a native-voice-content source, foreign-voice-content sources, a mixed-multimedia source and a location-based-content source. The gaming-content source is operable to collect and provide video game content generated by the video game application via participation of the native user and/or any foreign users. To facilitate the latter, the gaming-content source 110 is operable to obtain (e.g., via queries and responses), via a communication link between the system 100 and the foreign device, the video game content generated by the foreign users.

The native-voice-content source is operable provide voice content of a phone call for origination ("originating-voice content") to the foreign-audio applications. Each of the foreign-voice-content sources is operable to provide, for termination to the native-audio application, voice content of the phone call ("terminating-voice content") terminated from its respective foreign user.

The mixed-multimedia source is operable to provide the mixed multimedia content received from a mobile content provider (e.g., a mobile television center). The mixed-multimedia source may obtain the mixed multimedia content via push and/or pull delivery mechanisms, including, for example, via broadcasts from the mobile content provider.

The location-based-content source is operable to provide location content associated with the system 100. To facilitate this, the location-based-content source may gather the location content via queries of a global-network-satellite system, including the global positioning system ("GPS") or GLONASS, and/or other position location system. Additionally, this example employs the process 200 to communicate five multimedia sessions.

The first multimedia session begins at termination block 210 and then transitions to process block 212. At process block 212, the first I/O 124 receives the video-game content from the gaming-content source 110, and then passes it to the engine 122.

The engine 122, in turn, forms adapted-game content from the video-game content and the abstracted functions for adapting the video-game content in accordance with the capabilities of the video game application. To form the adapted-game content, the engine 122 may apply such abstracted functions to the video-game content, as shown in process block 214. By way of example, the engine 122 may apply the abstracted functions for adapting the video game content for tactile sensation controls. Application of these abstracted functions may adapt the video game content to add, increase, decrease and/or otherwise adjust tactile sensation components of the video game content.

Alternatively, the engine 122 may apply the abstracted functions for adapting the characteristics of the video game content with audio and/or video quality enhancement and/or control. These enhancements may include, for example, tone control, color enhancement, color correction and/or tinting.

After forming the adapted-game content, the engine 122 communicates it to the second I/O 126. At process block 216, the second I/O 126 communicates the adapted-game content to the video game application. In turn, the video game application services the adapted-game content for presentation (e.g., playback) to the user of the device 100, as shown in process block 218.

At some point during the first session, the second session begins, as shown in termination block 210. The second session may begin in response to one or more of the foreign users originating a call to the native user and/or the native user supplying an off-hook condition or other indication indicating that the call has been answered.

At process block 212, the first I/O 124 may receive the originating-voice content from the native-voice-content source, and then pass it to the engine 122. The engine 122, which is handling the adapted-game content, attempts to discern from information associated with the origination of the phone call one or more capabilities of the foreign-audio application that originated the phone call. If any other of the foreign-audio applications is connected on the phone call, the engine 122 may also attempt to discern the capabilities of such applications. At a minimum, the engine 122 can discern from the information the multimedia protocols used to code the originating-voice content.

After reception of the originating-voice content, the engine 122 may form adapted-originating-voice content from the originating-voice content and the abstracted functions for adapting the originating-voice content in accordance with the capabilities of the foreign-audio application for each foreign user. To form the adapted-originating-voice content, the engine 122 may apply such abstracted functions to the originating-voice content, as shown in process block 214. For example, the engine 122 may apply one or more of the abstracted functions to adapt the characteristics of the originating-voice content so as to remove from such content any tone control applied thereto by the native-voice-content source.

After forming adapted-originating-voice content, the engine 122 communicates it to the second I/O 126. At process block 216, the second I/O 126 communicates to each of the foreign-audio applications respective versions of the adapted-originating-voice content. In turn, the foreign-audio applications may service their respective versions of the adapted-originating-voice content for presentation (e.g., playback) to the respective foreign users, as shown in process block 218.

At some point during either or both of the first and/or second sessions, the third session begins, as shown in termination block 210. At process block 212, the first I/O 124 may receive the terminating-voice content from one or more of the foreign-audio sources, and then pass it to the engine 122. The engine 122, in turn, forms adapted-audio content from the terminating-voice content, the un-adapted video game content, the adapted-game content and the abstracted functions for adapting such content in accordance with the capabilities of the video game application and/or the native-audio application. To form such content, the engine 122 may apply these abstracted functions to the terminating-voice content, the un-adapted video game content and/or the adapted-game content, as shown in process block 214.

For instance, the engine 122 may apply the abstracted functions for adapting the terminating-voice content, the un-adapted video game content and/or the adapted-game content to limit attenuation and/or drowning out of the adapted-game content. To do this, the engine 122 may apply the abstracted functions for attenuating the terminating-voice content. Alternatively and/or additionally, the engine 122 may apply the abstracted functions for amplifying the un-adapted video game content and/or the adapted-game content.

As another option, the engine 122 may apply the abstracted functions for adapting the un-adapted video game content and/or the adapted-game content to fade out. Alternatively, the engine 122 may apply the abstracted functions adapt the terminating-voice content to fade in or immediately play. This way, the servicing of the adapted-mixed content by the native-audio application allows a conversation to ensue without causing the video game application to undesirably time out or experience other undesirable stoppages in play of the adapted-game content. This also prevents the adapted-game content from being commingled with and/or being masked or otherwise drowned out by servicing of the adapted-terminating-voice content.

The engine 122 communicates the adapted-mixed content to the second I/O 126 at some time after forming it. At process block 216, the second I/O 126 communicates the adapted-mixed content to the video game application and native-audio application, where appropriate. In turn, the video game application and the native-audio application service the adapted-mixed content for presentation (e.g., playback) to the user of the system 100, as shown in process block 218.

As above, the second and third sessions allow for bidirectional conversation between the native-audio and the foreign-audio applications, while allowing for simultaneous or substantially simultaneous servicing of adapted-game content by the video game application. In turn, this allows for interoperability and seamless capabilities negotiations between (i) the native-audio and the foreign-audio applications, and (ii) the video game application and the native-audio and the foreign-audio applications.

Completion of the phone call causes the second and third sessions to terminate, as shown in termination block 220. In this example, the first session does not terminate, and the process 200 returns to process block 214.

At process block 214, the engine 122 may apply the abstracted functions for adapting the un-adapted game and/or adapted-game content to fade after completion of the phone call. These functions may be operable to fade in the adapted-game content at the same position or a position before or after the position from where the native-audio application caused the fade out of the adapted-game content.

During the first session, the fourth session is started, as shown in termination block 210. At process block 212, the first I/O 124 may receive the mixed multimedia content from mixed-multimedia source, and then may pass it to the engine 122. The engine 122, in turn, forms adapted-mixed content from the mixed multimedia content and the abstracted functions for adapting the mixed multimedia content, the un-adapted video game content and/or the adapted-game content in accordance with the capabilities of the video game application and/or the native-mixed-media application. To do this, the engine 122 may apply such abstracted functions to the mixed multimedia content, the un-adapted video game content and/or the adapted-game content, as shown in process block 214.

For example, the engine 122 may apply the abstracted functions to adapt the mixed multimedia content, the un-adapted video game content and/or the adapted-game content to immediately attenuate or drown out of the adapted-game content in lieu of the adapted-mixed content. Such processing beneficially allows messages that contain important information (e.g., a message issued by the authorities warning of an impending danger or concern, such as tornado, hurricane, other inclement weather conditions, bomb threat, civil uprising, etc) to take precedence over adapted-game content. To do this, the engine 122 may apply to the video game content the abstracted functions for attenuating the video game content. Alternatively and/or additionally, the engine 122 may apply to the mixed multimedia content the abstracted functions for amplifying the mixed multimedia content.

As another option, the engine 122 may apply the abstracted functions for adapting the un-adapted video game content and/or the adapted-game content characteristics to fade out, and/or for adapting the mixed multimedia content to fade in or immediately play. This way, the servicing of the adapted-mixed content by the native-mixed media application allows the adapted mixed content to be presented without causing the video game application to undesirably time out or experience other undesirable stoppages in play of the adapted-game content. This also prevents the adapted-mixed content from being commingled with, masked by or otherwise drowned out by the servicing of the adapted-game content.

After forming the adapted-mixed content, the engine 122 communicates it to the second I/O 126. At process block 216, the second I/O 126 communicates the adapted-mixed content and adapted-game content to the native-mixed-media application and the video game application, respectively. In turn, the native-mixed-media application and the video game application service the adapted-mixed content and the adapted-video content for presentation (e.g., playback) to the native user, as shown in process block 218.

Prior to forming the adapted-mixed content, a fifth session may be started, as shown in termination block 210. This fifth session may be used to control initiation of the fourth session. For example, the fifth session might not allow initiation of the fourth session when the mixed multimedia content (e.g., a warning message of impeding danger) is not applicable to the location associated with the native user. Alternatively, the fifth session may trigger or otherwise cause initiation of the fourth session when the mixed multimedia content (e.g., a warning message of impeding danger) is applicable to the location associated with the native user.

The fifth multimedia sessions begins at termination block 210 and then transitions to process block 212. At process block 212, the first I/O 124 receives location content from the location-based-content source, and passes it to the engine 122. The engine 122, in turn, forms adapted-location-based content from the mixed multimedia content and the abstracted functions for adapting the mixed multimedia content associated with the fourth session in accordance with the capabilities of the location-based-multimedia application, as shown in process block 214. For example, the engine 122 may apply such abstracted functions to adapt the mixed multimedia content so as localize the mixed content in accordance with the location content.

After forming the adapted-location-based content, the engine 122 communicates it to the second I/O 126. At process block 216, the second I/O 126 communicates to the adapted-location-based content to the location-based-multimedia application. In turn, the location-based-multimedia application services the adapted-location-based content for presentation (e.g., playback) of the adapted-mixed content to the native user, as shown in process block 218.

Although only two examples for employing the process 200 are described, other examples are possible as well. In addition, the process 200 may support most any number of multimedia sessions, depending, of course, on the capabilities of the system 100, including bandwidth for communicating and/or receiving the multimedia content, processing power for processing the multimedia content, memory capacity and/or memory allocation associated with the multimedia-processing module 120.

Alternative Architecture

Figure 3:
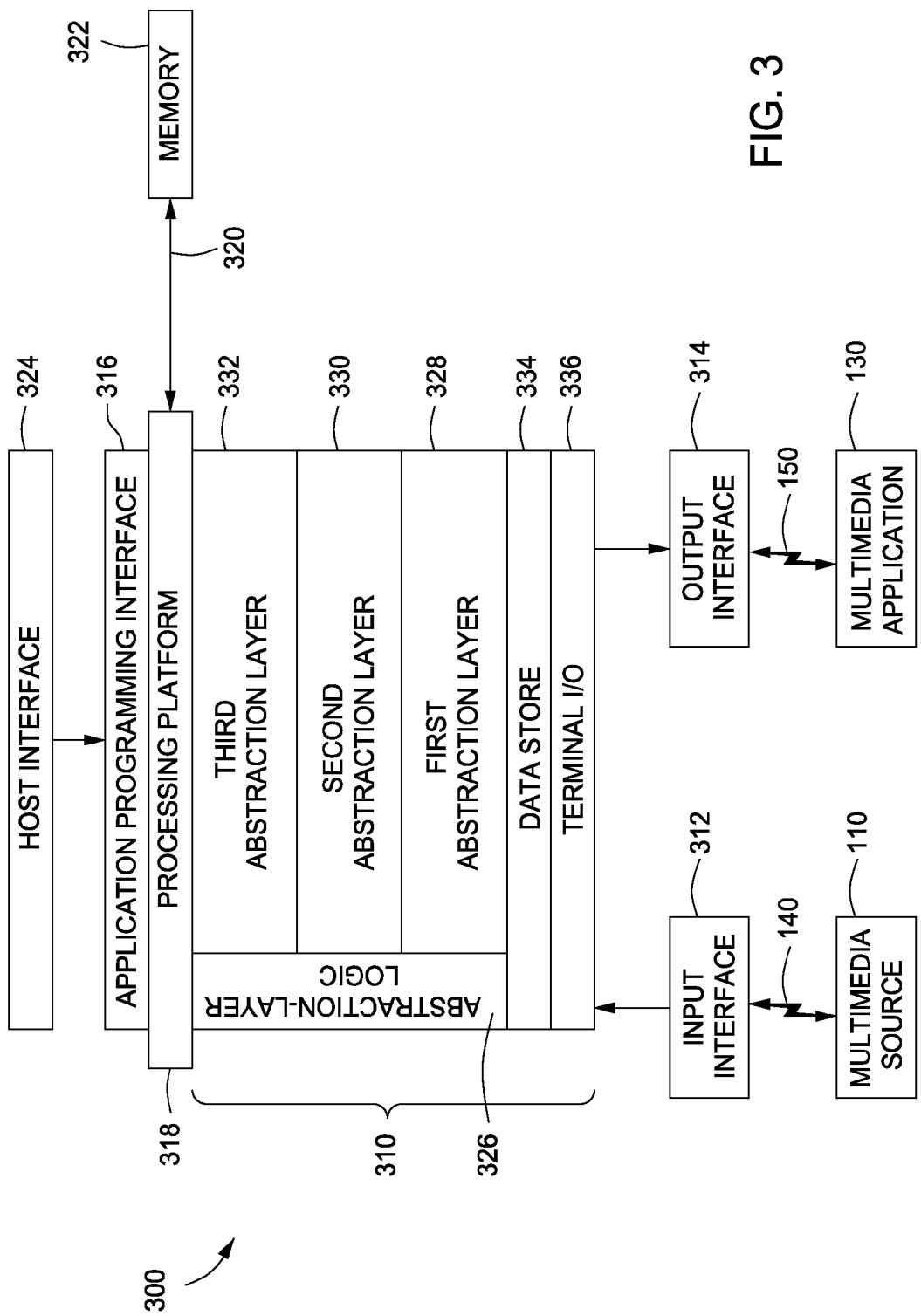
FIG. 3 is a second block diagram depicting an example of an multimedia-processing module for adapting multimedia content for presentation by a multimedia application.

Referring now to FIG. 3, a block diagram depicting an example of a multimedia-processing module 300 for adapting multimedia content for presentation by a multimedia application is shown. The multimedia-processing module 300 is similar to the multimedia-processing module 120 of FIG. 1, except as described herein.

The multimedia-processing module 300 is operable to process multimedia content received from the multimedia source 110 into adapted-multimedia content, and communicate the adapted-multimedia content to multimedia application 130 for subsequent presentation. To facilitate this, the multimedia-processing module 300 may be communicatively coupled to the multimedia source 110 via the first communication path 140; over which the multimedia-processing module 120 may receive the multimedia content. The multimedia-processing module 300 may be also communicatively coupled to the multimedia application 130 via the second communication path 150; over which the multimedia-processing module 300 may send the adapted-multimedia content.

To facilitate the foregoing, the multimedia-processing module 300 may include an engine 310, an input interface 312, an output interface 314, an application-programming interface 316, a processing platform 318, a bus 320, memory 322, and a host interface 324. The engine 310 and/or any other portion of the multimedia-processing module 300 may be formed from one or more directives for processing the multimedia content received via the input interface 312 into the adapted-multimedia content, and for communicating the adapted-multimedia content to the output interface 314.

The directives and/or any other portion of the engine 310 may be implemented in software, firmware and/or hardware, and executed or otherwise addressed and instructed by the processing platform 318 to carry out such processing. To facilitate this, the processing platform 318 may include, for example, any of a general purpose computer, a special-purpose computer, a field programmable gate array ("FPGA"), an application specific integrated circuit ("ASIC"), a general purpose processor ("GPP"), a system on a chip ("SoC"), and the like.

To facilitate the processing of the directives, the engine 310 includes first, second and third abstraction layers 328, 330 and 332; one or more sets of logic (collectively "abstraction-layer logic") 326; a data store 334; and a terminal I/O 336. Each of the first, second and third abstraction layers 328, 330 and 332 may include one or more of the abstracted functions. These abstracted functions, in turn, may include one or more common functions and one or more distinctive functions.

The common functions are employed to avoid needless repetition and storage of properties and/or distinguishing features of the multimedia protocols. To facilitate this, the common functions may be abstracted in accordance with the properties and/or distinguishing features that are common to a majority or other significant percentage of the multimedia protocols (collectively "common properties and/or features").

The distinctive functions may be abstracted in accordance with one or more properties and/or distinctive features of at least one, a minority, but not all, of the multimedia protocols abstracted. This way, the properties or distinguishing features that are not common to majority or other significant percentage of the multimedia protocols can be accommodated to allow the multimedia-processing module 300 to process the multimedia content formatted according to most any multimedia protocol.

In addition, the first, second and third abstraction layers 328, 330 and 332 may define respective levels of abstraction. Each of the levels of abstraction may define the common and distinctive functions for adapting the multimedia content at its corresponding level of abstraction. For example, the first, second and third abstraction layers 328, 330 and 332 may define respective domains, such as a physical domain, a logical-level domain, and an application-services domain, which, when combined in a hierarchal or other manner, define a model or protocol stack for adapting the multimedia content.

As part of the model, the first abstraction layer 328 as embodied as a physical domain may define the common and distinctive functions that are applicable to adapting the multimedia content at a physical level. The common and distinctive functions for this level typically exhibit characteristics that include at least one of (i) uncomplicated definitions, (ii) time-critical processing, (iii) high reusability, and (iv) localized-data-dependency utilization for allowing multiple threads and use of parallel hardware. Examples of the common and distinctive functions include functions for interfacing with memory of the data store 334; motion estimation and compensation; two-dimensional transforms, such as DCT and Integer transforms; color space conversion, such as conversion between RGB and YUV; interpolation for enlarging a size of picture and/or other transforms; video interlace processing; two-dimensional video smoothing and de-blocking filters; and the like.

The multimedia (i.e., incoming) content processed by the common and distinctive functions of the physical domain may flow from a physical medium via the terminal I/O 336 through the physical domain, and onto the second abstraction layer 330 as embodied as a logical-level domain via an interface between the physical and logical-level domains ("physical/logical interface"). The adapted-multimedia (i.e., outgoing) content processed by the common and distinctive functions of the physical domain may flow from the logical-level domain via the physical/logical interface through the physical domain and on to the physical medium via the terminal I/O 336.

The logical-level domain may define the common and distinctive functions that are applicable to adapting the multimedia content at a logical level. The common and distinctive functions for this level typically exhibit characteristics that include at least one of (i) moderately complex definitions, (ii) time-critical processing, and (iii) stability. Examples of the common and distinctive functions for this domain include functions for video block syntax parsing; reconstruction; variable length code and/or arithmetic code logic; simple filtering and transforms; Durbin recursion; codebook searches; quantization; and the like.

The multimedia content processed by the common and distinctive functions of the logical-level domain may flow from the physical domain via the physical/logical interface through the logical-level domain, and on to the application-services domain via an interface between the logical-level and application-services domains ("logical/application interface"). The adapted-multimedia content processed by the common and distinctive functions of the logical-level domain may flow from the application-services domain via the logical/application interface domain, and on to the physical domain via the physical/logical interface.

The third abstraction layer 332 as embodied as an application-services domain may define the common and distinctive functions that are applicable to adapting the multimedia content at an application-services level. The common and distinctive functions for this level typically exhibit characteristics that include at least one of (i) highly-complex definitions, (ii) infrequently used; (iii) low requirement for time-critical processing, (iv) efficient implementation in firmware, and (v) evolving requirements. Examples of the common and distinctive functions for this domain include functions for state machines for frame and header syntax parsing; protocol handling and stream synchronization; exception handling; data buffering logic; function scheduling; options and steering logic; and the like.

The multimedia content processed by the common and distinctive functions of the application-services domain may flow to the application-services domain via the logical/application interface. The adapted-multimedia content processed by the common and distinctive functions of the application-services domain may flow to the logical-level domain via the logical/application interface.

The multimedia content need not be processed by the common and distinctive functions of each of the first, second and third abstraction layers 328, 330 and 332 to form the adapted-multimedia content. Selection of the common and distinctive functions of any or all of the first, second or third abstraction layers 328, 330 and 332 may be based on the type multimedia content and the multimedia application's capabilities.

The abstraction-layer logic 326 controls selection of the common and distinctive functions for adapting the multimedia content. To facilitate this, the abstraction-layer logic 326 may interface with one or more of the first, second and third abstraction layers 328, 330 and 332 to select and apply the common and distinctive functions to the multimedia content to form the adapted-multimedia content.

For example, the abstraction-layer logic 326 may interface with the first, second and third abstraction layers 328, 330 and 332 to select and apply the common and distinctive functions from the second and third abstraction layers 330, 332, but to select and apply only the common functions of the first abstraction layer 328. Alternatively, the abstraction-layer logic 326 may interface with the first, second and third abstraction layers 328, 330 and 332 to select and apply only the common functions from each of the second and third abstraction layers 330, 332. Other combinations are possible as well.

As noted above, the abstraction-layer logic 326 is operable to select the common and distinctive functions based, in part, on the multimedia application's capabilities. The API 316 may be used to configure the abstraction-layer logic 326 to select the common and distinctive in accordance with the multimedia-application's capabilities. Like the API 128 of FIG. 1, the API 316 is operable to obtain the multimedia application's capabilities. For example, the API 316 (via execution by the processing platform 318 and/or instructions received via host interface 324) may interface with and/or extract from the multimedia application 130 the multimedia application's capabilities.

With knowledge of the multimedia application's capabilities, the API 316 (via execution by the processing platform 318 and instructions received via host interface 324) is operable to interface with and configure the abstraction-layer logic 326. To facilitate this, the API 316 may include directives that cause the abstraction-layer logic 326 to select the abstracted common and/or distinctive functions associated with the abstraction layers 328, 330 and 332.

The API 316 may also include directives for accessing and adjusting one or more parameters usable by the common and/or distinctive functions associated with the first, second and third abstraction layers 328, 330 and 332. These parameters may include at least one parameter for tone control, video quality control, video enhancement, and the like.

The following describes an example of processing streaming video content through the first, second and third abstraction layers 328, 330 and 332 for presentation by multimedia application 130, which is operable to present streaming video. The streaming video content originates from the multimedia source 110 and flows to the input interface 312 via the communication path 140. The streaming video content is then passed to the API 316. The API 316, in turn, configures the abstraction-layer logic 326 to identify and select one or more of the common and distinctive functions that are applicable to the multimedia application's capabilities.

Based on this configuration, the abstraction-layer logic 326 intelligently parses and selectively applies its directives to process the streaming video content through the first, second and third abstraction layers 328, 330 and 332 to form adapted-streaming-video content. The abstraction layer logic 326 may intelligently parses and selectively apply its directives to process the streaming video content in accordance with the distinctive and common functions of the abstraction layers 328, 330 and 332 as follows:

The first abstraction layer 328 as embodied as a physical domain may define the common and distinctive functions that are applicable to adapting the video streaming content at a physical level. The features and functions selected and processed at this first abstraction layer 328 may exhibit the following characteristics: straightforward definitions, high real-time requirements, high reusability and localized data dependency allowing multiple threads and parallel hardware. Some examples pertaining to streaming video may include, for example: memory interface, motion estimation and compensation, 2D transforms (DCT and Integer), color space conversion (RGB, YUV), interpolation (e.g. picture size enlargement), video interlace processing and 2D video smoothing and de-blocking filters, and the like.

The second abstraction layer 330 as embodied as a logical domain may define the common and distinctive functions that are applicable to adapting the streaming video content at a logical level. The features and functions selected and processed at this second abstraction layer 330 may exhibit, for example, the following characteristics: moderate complexity logic, high real-time requirements and stable functions. Some examples pertaining to streaming video may include, for example, video block syntax parsing, reconstruction, variable length code (VLC) and arithmetic code logic, simple filtering and transforms, Durbin recursion, codebook searches and quantization, and the like.

The third abstraction layer 332 as embodied as an applications-services domain may define the common and distinctive functions that are applicable to adapting the streaming video content at an applications-services level. The features and functions selected and processed at this third abstraction layer 332 may exhibit, for example, the following characteristics: high complexity logic, low real-time requirements, often seldom used functions, efficiently implemented in firmware and functions that may have evolving requirements. Some examples pertaining to streaming video content may include, for example, state machines for frame and header syntax parsing, protocol handling and stream synchronization, exception handling, data buffering logic, function scheduling and options and steering logic, and the like.

After processing, the adapted-streaming-video content may be sent to the output interface 314. In turn, the output interface 314 passes the adapted-streaming-video content, via the communication path 150, to the multimedia application 130 for presentation.

With reference now to both FIG. 1 and FIG. 3, the engine 122 and the engine 310 alone or in combination with the corresponding API 128 and API 316 may be processed into hardware description language ("HDL") logic, such as Register-Transfer Logic ("RTL") and/or multi-processor capability logic, and then affixed to a tangible media. The HDL logic may be formed using a high-level programming code, such as C++. This high-level programming may be optimized and enhanced to create an integrated circuit having a small hardware footprint, low power consumption, high performance, and low complexity.

The HDL logic may be used as an intellectual property ("IP") block or other intellectual-property core. The IP block may be processed into a semiconductor device, such as a FPGA, an ASIC, a GPP, SoC, etc., so as to form a functional integrated circuit that may be used, for example, in the aforementioned next-generation handheld device.

Example IP Block Formation

Figure 4:
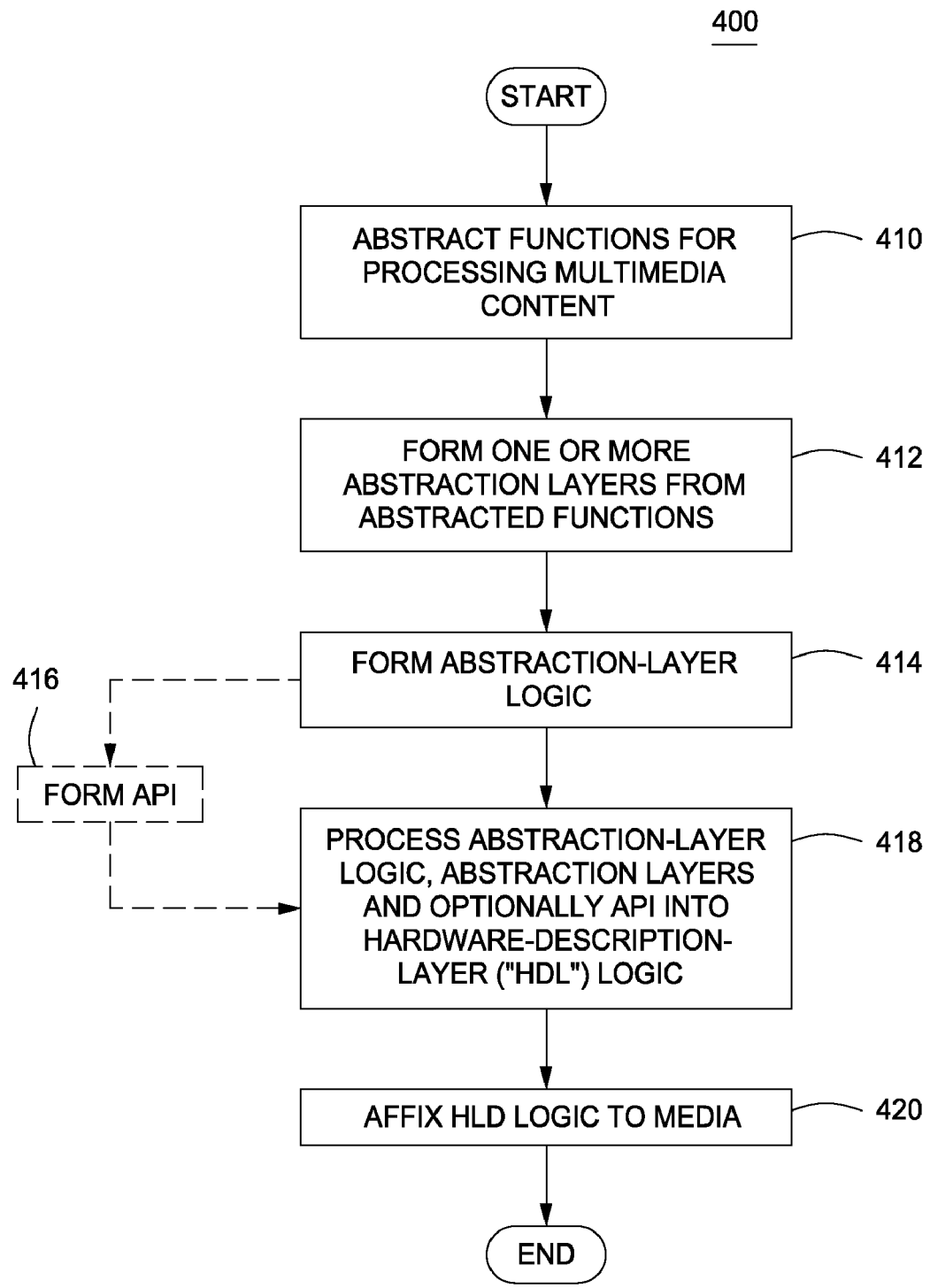
FIG. 4 is a second flow diagram depicting an example of a process for forming an intellectual-property block for adapting multimedia content for presentation by a multimedia application.

FIG. 4 is a flow diagram depicting an example of a process 400 for forming an intellectual-property block for adapting multimedia content for presentation by a multimedia application. The process 400 is described with reference to the architecture of the multimedia-processing module 310 of FIG. 3; however, the process 400 may be carried out for other architectures as well.

At process block 410, one or more functions for processing the multimedia content in accordance with the multimedia protocols are abstracted from the multimedia protocols to form the abstracted functions. At process block 412, one or more of the first, second and third abstraction layers 328, 330 and 332 are formed from the abstracted functions. At process block 414, the abstraction-layer logic 326 is formed to effectuate the first, second and third abstraction layers 328, 330 and 332 formed at process block 412.

At process block 418, the abstraction-layer logic 326 and the first, second and third abstraction layers 328, 330 and 332 formed at process block 412 are processed into HDL logic using conventional processes for forming such HDL logic. At block 420, the HDL logic is affixed to a tangible media.

And at optional process block 416, the API 316 is formed. If formed, then at process block 418, the API 316 is processed into HDL logic along with the abstraction-layer logic 326 and the first, second and third abstraction layers 328, 330 and 332 formed at process block 412.

Example Integrated Circuit Formation

Figure 5:
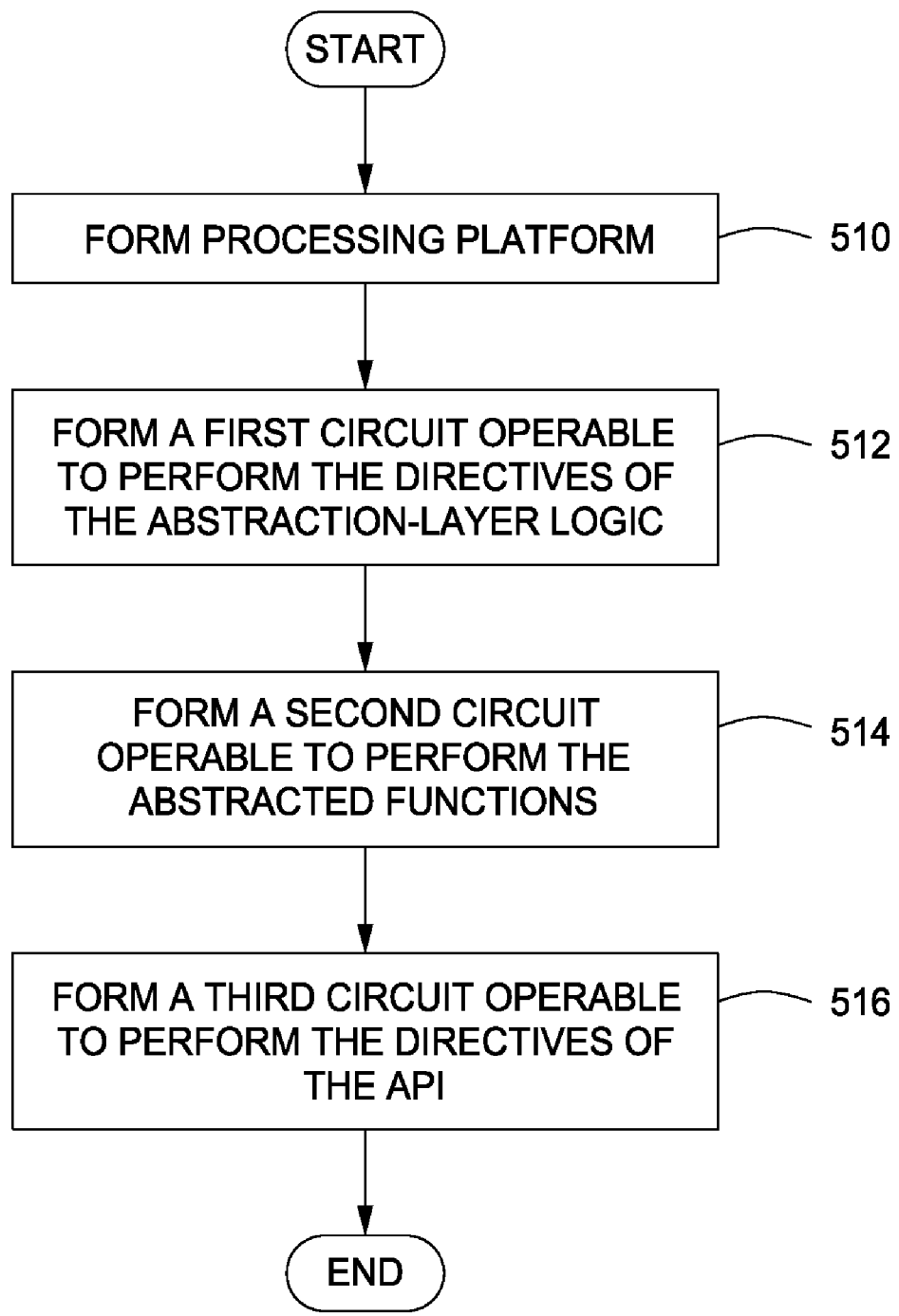
FIG. 5 is a third flow diagram depicting an example of a process for forming an integrated circuit for adapting multimedia content for presentation by a multimedia application.

FIG. 5 is a flow diagram depicting an example of a process 500 for forming an integrated circuit for adapting multimedia content for presentation by a multimedia application. The process 500 is described with reference to the architecture of the multimedia-processing module 310 of FIG. 3; however, the process 500 may be carried out for other architectures as well.

At process block 510, the processing platform 318 is formed in a first semiconductor substrate. At process block 512, a first circuit operable to perform the directives of the abstraction-layer logic 326 is formed in a second semiconductor substrate and communicatively coupled to the processing platform 318. This first circuit may be formed using the HDL logic formed at process block 418 of FIG. 4.

At process block 514, a second circuit operable to perform at least one of the abstracted functions of one or more of the first, second and third abstraction layers 328, 330 and 332 is formed in the second semiconductor substrate and communicatively coupled to the first circuit. The second circuit may be formed using the HDL logic formed at process block 418 of FIG. 4

At process block 516, a third circuit operable to perform the directives of the API 316 is formed in the second semiconductor substrate and communicatively coupled to the processing platform 318, the first circuit and the second circuit. The third circuit may be formed using the HDL logic formed at process block 418 of FIG. 4

Although the process 500 depicts the processing-platform 318 being formed in the first semiconductor substrate and the first, second and third circuits being formed in the second semiconductor substrates, the processing-platform and the first, second and third circuits may be monolithically formed. As another alternative, the process 500 may be employed to monolithically form the entire multimedia-processing module 300.

CONCLUSION

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

In addition, any of the communication networks referenced with respect to the communication paths 140, 150 may be a partial or full deployment of most any communication or computer network, and thus, can include a few or many network elements, most of which are not shown. Each of the communication networks may include circuit-switched as well as packet-data elements to provide transport of the multimedia content and/or adapted-multimedia content, and can be public or private, terrestrial wireless or satellite, and/or wireline.

Each of the networks may include portions of a Public Switch Telephone Network (PSTN), the Internet, core and proprietary public networks, wireless voice and packet-data networks, such as 1G, 2G, 2.5G and 3G telecommunication networks, wireless office telephone systems ("WOTS") and/or wireless local area networks (WLANs), including, Bluetooth and/or IEEE 802.11 WLANs, and the like.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

The invention claimed is:

1. An apparatus for adapting multimedia content for presentation by an application, the apparatus comprising, in combination:
   an input for receiving multimedia content, the multimedia content being formatted in accordance with at least one of a plurality of multimedia CODECs;
   a processor; and
   a memory communicably coupled to the processor,
   wherein the processor is operative to execute, out of the memory, an integrated software implementation for the plurality of multimedia CODECs, wherein the integrated software implementation includes one or more abstraction layers, an application-programming interface, and abstraction layer logic, wherein the one or more abstraction layers are operative to abstract one or more functions from the plurality of multimedia CODECs, wherein the application-programming interface includes one or more directives, and wherein the abstraction layer logic is operative, in response to at least one of the one or more directives, to select from among the one or more functions for adapting the multimedia content in accordance with a capability of the application; and an output for communicating the multimedia content so adapted to the application.

2. The apparatus of claim 1, wherein the application-programming interface is operative to interface with the abstraction layer logic to configure the abstraction layer logic for performing the one or more functions for adapting the multimedia content.

3. The apparatus of claim 1, wherein the application-programming interface is operable to obtain the capability of the application.

4. The apparatus of claim 1, wherein the plurality of multimedia CODECs for processing the multimedia content comprises:
a first multimedia CODEC; and
a second multimedia CODEC.

5. The apparatus of claim 1, wherein the multimedia content comprises any of video, audio, speech, and rich text.

6. The apparatus of claim 1, wherein the one or more functions are abstracted in accordance with at least one characteristic common to at least some of the plurality of multimedia CODECs.

7. The apparatus of claim 1, wherein the plurality of multimedia CODECs comprises a first CODEC, and wherein the one or more functions are abstracted in accordance with at least one characteristic of the first CODEC.

8. The apparatus of claim 1, wherein the one or more abstraction layers comprise first, second and third abstraction layers, wherein each of the first, second and third abstraction layers defines a respective level of abstraction, and wherein each of the first, second and third abstraction layers comprises at least one of the one or more functions, and wherein the one or more functions are abstracted in accordance with at least one characteristic common to at least some of the plurality of multimedia CODECs at the respective levels of abstraction.

9. The apparatus of claim 8, wherein the first, second and third abstraction layers are arranged in a hierarchical order, respectively.

10. The apparatus of claim 9, wherein the third abstraction layer comprises at least one function for adapting the multimedia content at an application-services level.

11. The apparatus of claim 8, wherein the one or more functions comprise one or more functions for adapting the multimedia content at a physical level.

12. The apparatus of claim 8, wherein the second abstraction layer comprises at least one function for adapting the multimedia content at a logical level.

13. The apparatus of claim 1, further comprising a processing platform.

14. The apparatus of claim 13, wherein the processing platform is operable to execute the abstraction layer logic for performing the one or more functions.

15. The apparatus of claim 13, wherein the abstraction layer logic and the application-programming interface are monolithically formed.

16. The apparatus of claim 1, wherein the application-programming interface is operable to configure at least one parameter for adjusting the one or more functions.

17. The apparatus of claim 16, wherein the at least one parameter comprise at least one parameter for tone control, video quality control, and video enhancement.

18. A system for adapting multimedia content for presentation by an application, the system comprising, in combination:
a processing platform including a processor, and a memory communicably coupled to the processor,
wherein the processor is operative to execute, out of the memory, an integrated software implementation for a plurality of multimedia CODECs,
wherein the integrated software implementation includes one or more abstraction layers, an application-programming interface, and abstraction layer logic,
wherein the one or more abstraction layers are operative to abstract one or more functions from the plurality of multimedia CODECs,
wherein the application-programming interface includes one or more directives,
wherein the abstraction layer logic is operative, in response to at least one of the one or more directives, to select from among the one or more functions for adapting multimedia content in accordance with a capability of the application, and
wherein the multimedia content is formatted in accordance with at least one of the plurality of multimedia CODECs.

19. The system of claim 18, wherein the processing platform is operable to execute the application-programming interface.

20. The system of claim 18, further comprising a host processor for instructing the application-programming interface to configure the abstraction layer logic.

21. A method of adapting multimedia content for presentation by an application, the multimedia content being formatted in accordance with at least one of a plurality of multimedia CODECs, the method comprising:
receiving the multimedia content;
executing an integrated software implementation for the plurality of multimedia CODECs, the integrated software implementation including one or more abstraction layers, an application-programming interface including one or more directives, and abstraction layer logic, the executing of the integrated software implementation including:
abstracting, by the one or more abstraction layers, one or more functions from the plurality of multimedia CODECs; and
in response to at least one of the one or more directives, selecting, by the abstraction layer logic, from among the one or more functions for adapting the multimedia content in accordance with a capability of the application; and
communicating the multimedia content so adapted to the application.

22. The method of claim 21, wherein the plurality of multimedia CODECs comprises a first multimedia CODEC, and a second multimedia CODEC.

23. An intellectual-property core for forming an apparatus for adapting multimedia content for presentation by an application, the intellectual-property core being affixed to a tangible media and comprising, in combination:
executable instructions for forming an integrated software implementation for a plurality of multimedia CODECs, the integrated software implementation including one or more abstraction layers, an application-programming interface including one or more directives, and abstraction layer logic,
wherein the one or more abstraction layers are operative to abstract one or more functions from the plurality of multimedia CODECs, and wherein the abstraction layer logic is operative, in response to at least one of the one or more directives, to select from among the one or more functions for adapting multimedia content in accordance with a capability of the application,
wherein the multimedia content is formatted in accordance with at least one of the plurality of multimedia CODECs.

24. The intellectual-property core of claim 23, wherein the application-programming interface is operative to interface with the abstraction layer logic to configure the abstraction layer logic for performing the one or more functions for adapting the multimedia content.

25. The intellectual-property core of claim 23, wherein the plurality of multimedia CODECs comprises a first CODEC, and a second CODEC.

26. The intellectual-property core of claim 23, wherein the one or more abstraction layers are further operative to abstract the one or more functions in accordance with at least one characteristic common to at least some of the plurality of multimedia CODECs.

27. The intellectual-property core of claim 23, wherein the plurality of multimedia CODECs includes a first CODEC, and wherein the one or more abstraction layers are further operative to abstract the one or more functions in accordance with at least one characteristic of the first CODEC.

28. The intellectual-property core of claim 23, wherein the one or more abstraction layers comprise first, second and third abstraction layers, wherein each of the first, second and third abstraction layers defines a respective level of abstraction, and wherein each of the first, second and third abstraction layers comprises at least one of the one or more functions, and wherein the one or more abstraction layers are further operative to abstract the one or more functions in accordance with at least one characteristic common to at least some of the plurality of multimedia CODECs at the respective levels of abstraction.

29. The intellectual-property core of claim 28, wherein the first, second and third abstraction layers are arranged in a hierarchical order, respectively.

30. A method of forming an intellectual-property core for adapting multimedia content for presentation by an application, the multimedia content being formatted in accordance with at least one of a plurality of multimedia CODECs, the method comprising, in combination:
producing an integrated software implementation for the plurality of multimedia CODECs, the integrated software implementation including one or more abstraction layers, an application-programming interface including one or more directives, and abstraction layer logic;
abstracting, by the one or more abstraction layers, one or more functions from the plurality of multimedia CODECs;
in response to at least one of the one or more directives, selecting, by the abstraction layer logic, from among the one or more functions for adapting the multimedia content in accordance with a capability of the application;
processing the integrated software implementation into hardware description layer logic; and
affixing the hardware description layer logic to tangible media.

31. The method of claim 30, further comprising:
configuring, by the application-programming interface, the abstraction layer logic for performing the one or more functions for adapting the multimedia content.

32. The method of claim 30, wherein the abstracting of the one or more functions comprises abstracting the one or more functions in accordance with at least one characteristic common to at least some of the plurality of multimedia CODECs.

33. The method of claim 30, wherein the plurality of multimedia CODECs includes a first CODEC, and wherein the abstracting of the one or more functions comprises abstracting the one or more functions in accordance with at least one characteristic of the first CODEC.

34. The method of claim 30, wherein the one or more abstraction layers comprise first, second and third abstraction layers, wherein each of the first, second and third abstraction layers defines a respective level of abstraction, and wherein each of the first, second and third abstraction layers comprises at least one of the one or more functions, and wherein the abstracting of the one or more functions from the plurality of multimedia CODECs includes abstracting the one or more functions in accordance with at least one characteristic common to at least some of the plurality of multimedia CODECs at the respective levels of abstraction.

35. The method of claim 34, further comprising forming the first, second and third abstraction layers in a hierarchical order, respectively.

36. A method of forming integrated circuitry for adapting multimedia content for presentation by a application, the multimedia content being formatted in accordance with at least one of a plurality of multimedia CODECs, the method comprising:
forming a first circuit operable to execute an integrated software implementation for a plurality of multimedia CODECs, the integrated software implementation including one or more abstraction layers for abstracting one or more functions from the plurality of multimedia CODECs, an application-programming interface including one or more directives, and abstraction layer logic for selecting, in response to at least one of the one or more directives, from among the one or more functions for adapting the multimedia content in accordance with a capability of the application; and
forming a processing platform for causing the logic to perform the at least one function for adapting the multimedia content.

37. The method of claim 36, further comprising:
forming a second circuit for interfacing with the abstraction layer logic to configure the abstraction layer logic to perform at least one of the one or more functions for adapting the multimedia content.

38. The method of claim 37, wherein at least one of the forming of the first circuit and the forming of the second circuit comprises using an intellectual-property core having executable instructions for forming at least part of the integrated software implementation.

* * * * *